United States Patent
Xu

(10) Patent No.: US 11,114,908 B2
(45) Date of Patent: Sep. 7, 2021

(54) ROTOR FOR ELECTRIC MOTOR, ELECTRIC MOTOR AND COMPRESSOR

(71) Applicants: ANHUI MEIZHI COMPRESSOR CO., LTD., Anhui (CN); MIDEA GROUP CO., LTD., Guangdong (CN)

(72) Inventor: Ben Xu, Anhui (CN)

(73) Assignees: ANHUI MEIZHI COMPRESSOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 135 days.

(21) Appl. No.: 16/582,335

(22) Filed: Sep. 25, 2019

(65) Prior Publication Data
US 2020/0021152 A1 Jan. 16, 2020

Related U.S. Application Data

(63) Continuation of application No. PCT/CN2017/118715, filed on Dec. 26, 2017.

(30) Foreign Application Priority Data

Mar. 28, 2017 (CN) .......................... 201710191555.2
Mar. 28, 2017 (CN) .......................... 201720322695.4

(51) Int. Cl.
*H02K 1/27* (2006.01)
*H02K 1/28* (2006.01)
*F25B 31/02* (2006.01)

(52) U.S. Cl.
CPC ............. *H02K 1/2746* (2013.01); *H02K 1/28* (2013.01); *F25B 31/02* (2013.01)

(58) Field of Classification Search
CPC .. H02K 1/276; H02K 1/2766; H02K 2213/03; H02K 1/2746; H02K 1/28; F25B 31/02
See application file for complete search history.

(56) References Cited

U.S. PATENT DOCUMENTS

2005/0001504 A1* 1/2005 Chang ..................... H02K 21/14
310/156.53

FOREIGN PATENT DOCUMENTS

| CN | 204794429 U | | 11/2015 |
|---|---|---|---|
| CN | 206041678 U | * | 3/2017 |

(Continued)

OTHER PUBLICATIONS

Machine Translation, YU, CN-206041678-U, Mar. 2017. (Year: 2017).*

(Continued)

*Primary Examiner* — Thomas Truong
(74) *Attorney, Agent, or Firm* — Scully, Scott, Murphy & Presser, P.C.

(57) ABSTRACT

Disclosed are a rotor for an electric motor, an electric motor, and a compressor. The rotor includes: a rotor core (1), provided with a shaft hole (11) and four magnet grooves (12); and four permanent magnets (2), disposed in corresponding magnet grooves, each permanent magnet including a first surface (21) and a second surface (22). When viewed from a projection surface, the first surface has an arc segment (211), and the second surface has a plurality of straight segments connected in sequence. A thickness H of each permanent magnet on a corresponding magnetic pole centerline, a length L of the second surface projected on the projection surface, and a radius R of the rotor core satisfying the following relationships: $0.24 \leq H/R \leq 0.26$ and $1.07 \leq L/R \leq 1.11$.

10 Claims, 3 Drawing Sheets

(56) References Cited

FOREIGN PATENT DOCUMENTS

| | | |
|---|---|---|
| CN | 206041678 U | 3/2017 |
| CN | 106953443 A | 7/2017 |
| CN | 206595793 U | 10/2017 |

OTHER PUBLICATIONS

International Search Report dated Mar. 28, 2018 issued in PCT/CN2017/118715.

* cited by examiner

US 11,114,908 B2

ROTOR FOR ELECTRIC MOTOR, ELECTRIC MOTOR AND COMPRESSOR

CROSS-REFERENCE TO RELATED APPLICATIONS

This is a by-pass continuation of International Application No. PCT/CN2017/072520, filed Jan. 24, 2017, the entire contents of which is incorporated herein by reference. No new matter is added.

FIELD

The present disclosure relates to the technical field of compressors, and more particularly, to a rotor for an electric motor, an electric motor having the rotor, and a compressor having the electric motor.

BACKGROUND

At present, a rotor of a permanent magnet synchronous electric motor adopts a tile-shaped ferrite permanent magnet, which has the advantages of providing a simple structure and enabling the high utilization of the magnet. The ferrite permanent magnet is arranged around a central shaft hole of the rotor. However, when the rotor needs to be miniaturized while a distance between the permanent magnet and the shaft hole needs to be ensured, the only option is to reduce a radial thickness of the permanent magnet. The reduction in the radial thickness of the permanent magnet results in a decrease of the magnetic energy product provided by the tile-shaped permanent magnet, which lowers the efficiency of the electric motor. At the same time, the reduction in the radial thickness of the permanent magnet causes a decrease in the anti-demagnetization capability of the electric motor, which weakens the reliability of the electric motor.

A permanent magnet with higher magnetic energy product and higher intrinsic coercivity can be used, as a solution to the above problems, but the cost of the electric motor increases.

SUMMARY

The present disclosure aims to solve one of the technical problems in the related art to some extent. Accordingly, the present disclosure provides a rotor for an electric motor, and the rotor has a more compact structure, thereby further reducing an overall size of the electric motor while guaranteeing the working performance of the electric motor.

The present disclosure further provides an electric motor having the above rotor.

The present disclosure further provides a compressor having the above electric motor.

The rotor according to embodiments of a first aspect of the present disclosure includes: a rotor core having a circular cross section, and provided with a shaft hole and four magnet grooves spaced around a circumference of the shaft hole, both ends of each magnet groove being provided with a magnetic isolation slot in communication with the magnet groove, and a magnetic isolation bridge being defined between adjacent two magnetic isolation slots; and four permanent magnets provided in the corresponding magnet grooves, a shape of each magnet groove matching a shape of each permanent magnet, each permanent magnet including a first surface and a second surface arranged opposite each other in a radial direction of the rotor core, the second surface being adjacent to the shaft hole, when viewed from a projection surface, the first surface including an arc segment, when viewed from the projection surface, second surface being formed by a plurality of straight segments connected sequentially, with an angle between adjacent straight segments, and the projection surface is a plane perpendicular to a central axis of the rotor. A thickness H of each permanent magnet on a corresponding magnetic pole centerline, a length L of the second surface projected on the projection surface, and a radius R of the rotor core satisfy the following relationships: $0.24 \leq H/R \leq 0.26$ and $1.07 \leq L/R \leq 1.11$, and the magnetic pole centerline is a line connecting a circle center of the shaft hole and a center of an imaginary circle containing the arc segment.

In the rotor for the electric motor according to embodiments of the present disclosure, since the thickness H of the permanent magnet on the corresponding magnetic pole centerline, the length L of the second surface projected on the projection surface, and the radius R of the rotor core satisfy the following relationships: $0.24 \leq H/R \leq 0.26$ and $1.07 \leq L/R \leq 1.11$, the overall structure of the rotor can be more compact while the working performance of the electric motor can be ensured, thereby reducing the overall volume of the rotor and the electric motor, and facilitating the miniaturization of the rotor and the electric motor.

In addition, the rotor according to embodiments of the present disclosure can have the following technical features.

According to an embodiment of the present disclosure, when viewed from the projection surface, the second surface includes a first straight segment, a second straight segment, and a third straight segment connected sequentially, and the first straight segment, the second straight segment, and the third straight segment are symmetrical about the magnetic pole centerline.

According to an embodiment of the present disclosure, a length L1 of the second straight segment and the radius R of the rotor core satisfy the following relationship: $0.67 \leq L1/R \leq 0.71$.

According to an embodiment of the present disclosure, an angle α between the first straight segment and the third straight segment has a range of $125° \leq \alpha \leq 145°$.

According to an embodiment of the present disclosure, each permanent magnet further includes a third surface and a fourth surface, when viewed from the projection surface, the third surface includes a fourth straight segment connecting a free end of the first straight segment and one end of the arc segment, when viewed from the projection surface, the fourth surface includes a fifth straight segment connecting a free end of the third straight segment and the other end of the arc segment, and the fourth straight segment and the fifth straight segment are both parallel to the magnetic pole centerline.

According to an embodiment of the present disclosure, the thickness H of each permanent magnet on the magnetic pole centerline is smaller than a thickness H1 of both ends of the permanent magnet in a direction parallel to the magnetic pole centerline.

According to an embodiment of the present disclosure, at least one end of each permanent magnet is provided with an assembly guiding structure.

According to an embodiment of the present disclosure, the assembly guiding structure is a chamfered structure formed at the at least one end of each permanent magnet.

The electric motor according to embodiments of a second aspect of the present disclosure includes a stator defining a rotor hole therein, and a rotor for an electric motor, the rotor being configured as the rotor according to the embodiments of the first aspect of the present disclosure and provided in the rotor hole.

For the electric motor according to the embodiments of the present disclosure, by providing the rotor according to the embodiments of the first aspect of the present disclosure, the overall volume of the electric motor can be reduced while the working performance of the electric motor can be ensured, thereby facilitating the miniaturization of the electric motor.

The compressor according to embodiments of a third aspect of the present disclosure includes the electric motor according to the embodiments of the second aspect of the present disclosure.

For the compressor according to the embodiments of the present disclosure, by providing the electric motor according to the embodiments of the second aspect of the present disclosure, the overall volume of the compressor can be reduced while the working performance of the compressor can be ensured, thereby facilitating the miniaturization of the compressor.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
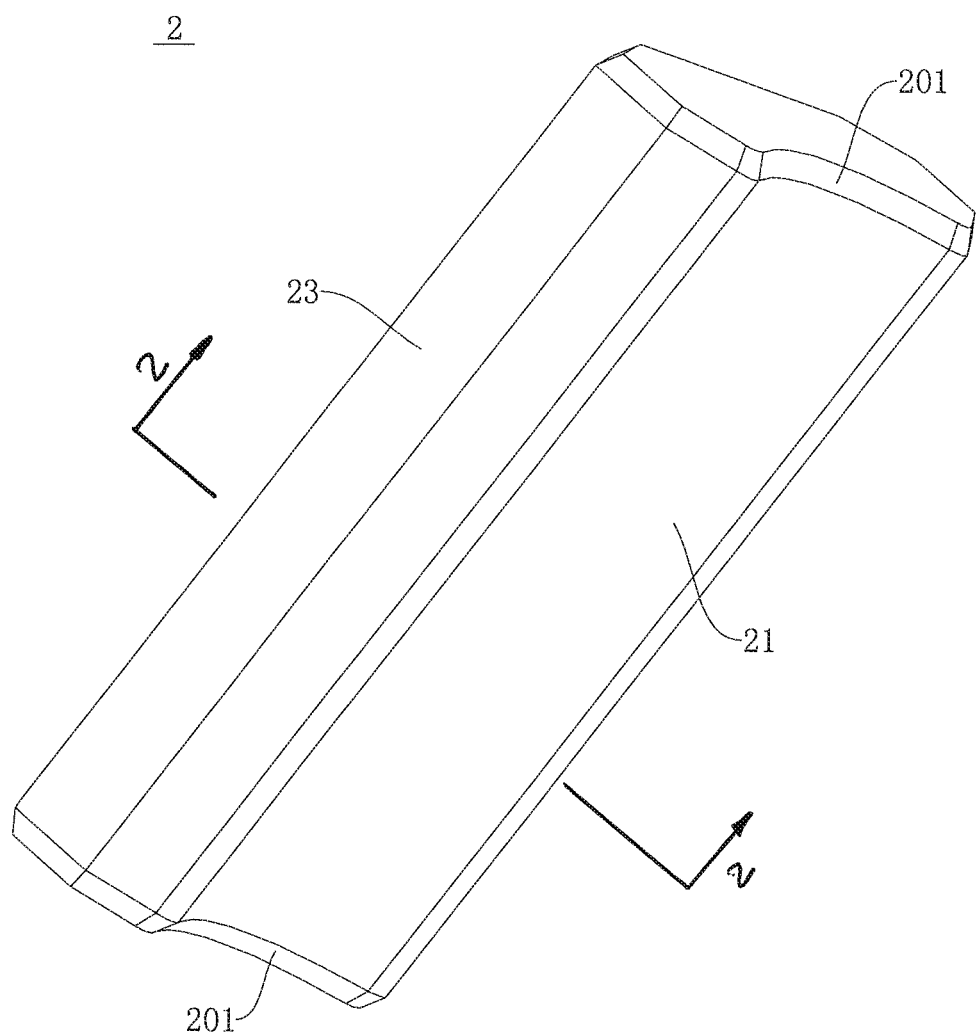
FIG. 1 illustrates a schematic view of a permanent magnet of a rotor for an electric motor according to an embodiment of the present disclosure.

REFERENCE NUMERALS rotor core 1, shaft hole 11, magnet groove 12, magnetic isolation slot 13, magnetic isolation bridge 14,
   permanent magnet 2, first surface 21, arc segment 211,
   second surface 22, first straight segment 221, second straight segment 222, third straight segment 223,
   third surface 23, fourth straight segment 231,
   fourth surface 24, fifth straight segment 241, assembly guiding structure 201.

DETAILED DESCRIPTION

Embodiments of the present disclosure will be described below in detail and examples of the embodiments will be illustrated in the drawings. The same or similar elements and the elements having same or similar functions are denoted by like reference numerals throughout the descriptions. The embodiments described herein with reference to the drawings are explanatory, which are merely used to illustrate the present disclosure and shall not be construed to limit the present disclosure.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description and do not indicate or imply that the device or element referred to must have a particular orientation, or be constructed and operated in a particular orientation.

In the description of the present disclosure, it should be understood that, unless specified or limited otherwise, the terms "mounted," "connected," and "coupled" and variations thereof are used broadly, and may be, for example, fixed connections, detachable connections, or integral connections; may also be mechanical or electrical connections; may also be direct connections or indirect connections via intervening structures; may also be inner communications or mutual interaction of two elements, which can be understood by those skilled in the art according to specific situations.

A rotor for an electric motor according to embodiments of a first aspect of the present disclosure will be described below with reference to FIGS. 1 to 4.

As illustrated in FIGS. 1-4, the rotor according to the embodiments of the present disclosure includes a rotor core 1 and four permanent magnets 2.

The rotor core 1 has a circular cross section, and is provided with a shaft hole 11 and four magnet grooves 12 spaced around a circumference of the shaft hole 11. A central axis XX' of the rotor, along which the rotor extends axially, is defined by the circular cross section of the rotor core 1. For example, the central axis extends through the center of the circular cross section of the rotor core 1. In this embodiment, the shaft hole 11 has a circular cross section with a center, which can coincide with the central axis of the rotor in the axial direction. The four magnet grooves 12 are arranged around the circumference of the shaft hole 11 and are substantially equally-distanced from each other along the circumference of the shaft hole 11. The four magnet grooves 12 are further arranged symmetrical with respect to the central axis. In this manner, the rotor can have a symmetrical and reasonable structure, and is convenient to process. Both ends of each magnet groove 12 are each provided with a magnetic isolation slot 13 that is in communication with a respective magnet groove. A magnetic isolation bridge 14 is defined between two adjacent magnetic isolation slots 13 circumferentially opposite each other. The magnetic flux leakage can be reduced by the magnetic isolation slots 13.

The four permanent magnets 2 are provided in the corresponding magnet grooves 12, respectively. The shape of each magnet groove 12 matches the shape of a respective the permanent magnet 2, such that each permanent magnet 2 can be stably fitted in its respective magnet groove 12. In some examples of the present disclosure, the permanent magnet 2 may be a ferrite permanent magnet 2, and the permanent magnet 2 may be substantially tile-shaped. The tile-shaped permanent magnet 2 makes the structure of the permanent magnet 2 simple and improves the utilization of the magnet.

The permanent magnet 2 includes a first surface 21 and a second surface 22 arranged opposite each other in a radial direction of the rotor core 1, which is perpendicular to the axial direction of the rotor core 1. The second surface 22 is radially approximate to the shaft hole 11 with respect to the first surface 21. The first surface 21, when projected on and viewed from a projection surface that is perpendicular to the central axis of the rotor core 1, includes an arc segment 211. The second surface 22, when projected on and viewed from the projection surface, is formed by a plurality of straight segments (for example, two segments, three segments, four segments, etc.) connected sequentially to one another, with an angle between two adjacent straight segments. Since the second surface 22 of the permanent magnet 2 is configured to be formed by the plurality of straight segments connected sequentially, the rotor can satisfy a setting requirement for miniaturization, and a safety distance between the permanent magnet 2 and the shaft hole 11 can be ensured. Moreover, the volume and the mass of the permanent magnets 2 can be increased. Hence the magnetic flux can be increased, thereby improving the performance of the electric motor. Compared with the rotors known in the related art, in which an outer diameter of the rotors is increased to meet the above requirements, the mass of the rotor core 1 can be reduced, thereby saving the cost.

In addition, a thickness H of the permanent magnet 2 on a corresponding magnetic pole centerline, a length L of the second surface 22 as projected on the projection surface, and a radius R of the rotor core 1 from the central axis satisfy the following relationships: $0.24 \leq H/R \leq 0.26$ and $1.07 \leq L/R \leq 1.11$. It should be noted that the magnetic pole centerline is a line connecting the center of the circular shaft hole 11 and a center of an imaginary circle containing the arc segment 211. That is, the ratio H/R of the thickness H of the permanent magnet 2 on the corresponding magnetic pole centerline to the radius R of the rotor core 1 is greater than or equal to 0.24 and less than or equal to 0.26, and meanwhile, the ratio L/R of the length L of the second surface 22 projected on the projection surface to the radius R of the rotor core 1 is greater than or equal to 1.07 and less than or equal to 1.11. In other words, the ratio H/R of the thickness H of the permanent magnet 2 on the corresponding magnetic pole centerline to the radius R of the rotor core 1 ranges from 0.24 to 0.26, and the ratio L/R of the length L of the second surface 22 projected on the projection surface to the radius R of the rotor core 1 ranges from 1.07 to 1.11. For example, the value of H/R may be 0.24, 0.245, 0.25, 0.258 or 0.26, etc., and the value of L/R may be 1.07, 1.08, 1.085, 1.09, 1.10 or 1.11, etc.

In the rotor for the electric motor according to embodiments of the present disclosure, the thickness H of the permanent magnet 2 on the corresponding magnetic pole centerline, the length L of the second surface 22 projected on the projection surface, and the radius R of the rotor core 1 satisfy the following relationships: $0.24 \leq H/R \leq 0.26$ and $1.07 \leq L/R \leq 1.11$. It has been discovered through experiments that, by providing the thickness, the length and the radius in accordance with the above relationship, the overall structure of the rotor can be unexpectedly compact without compromising the performance of the electric motor. As a result, the overall size of the rotor and the electric motor and the production cost of the rotor and the electric motor can be reduced, which allows additional miniaturization of the rotor and the electric motor.

Figure 2:
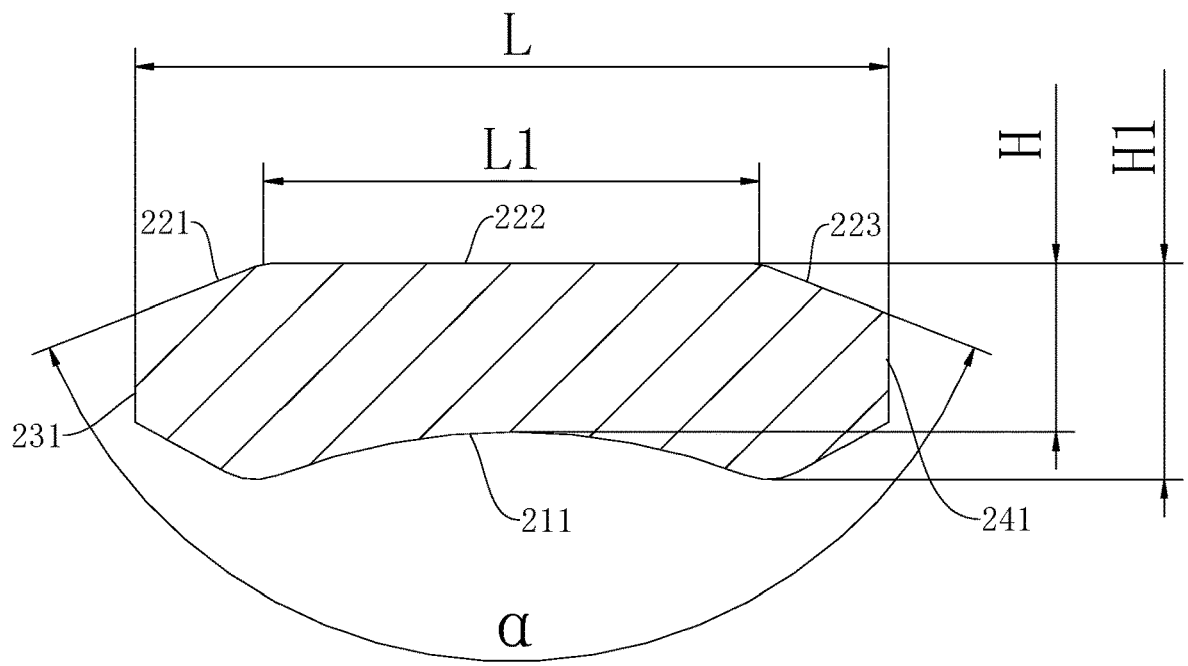
FIG. 2 illustrates a sectional view of the permanent magnet in FIG. 1.
Figure 3:
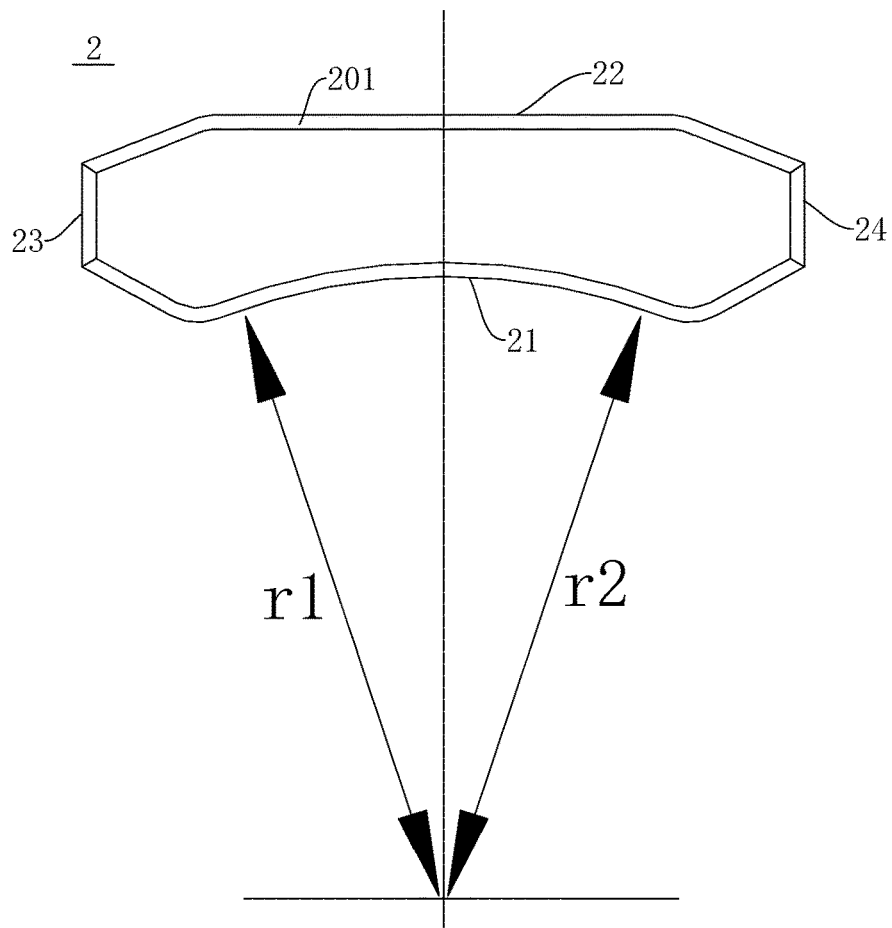
FIG. 3 illustrates a side elevation view of the permanent magnet in FIG. 1.
Figure 4:
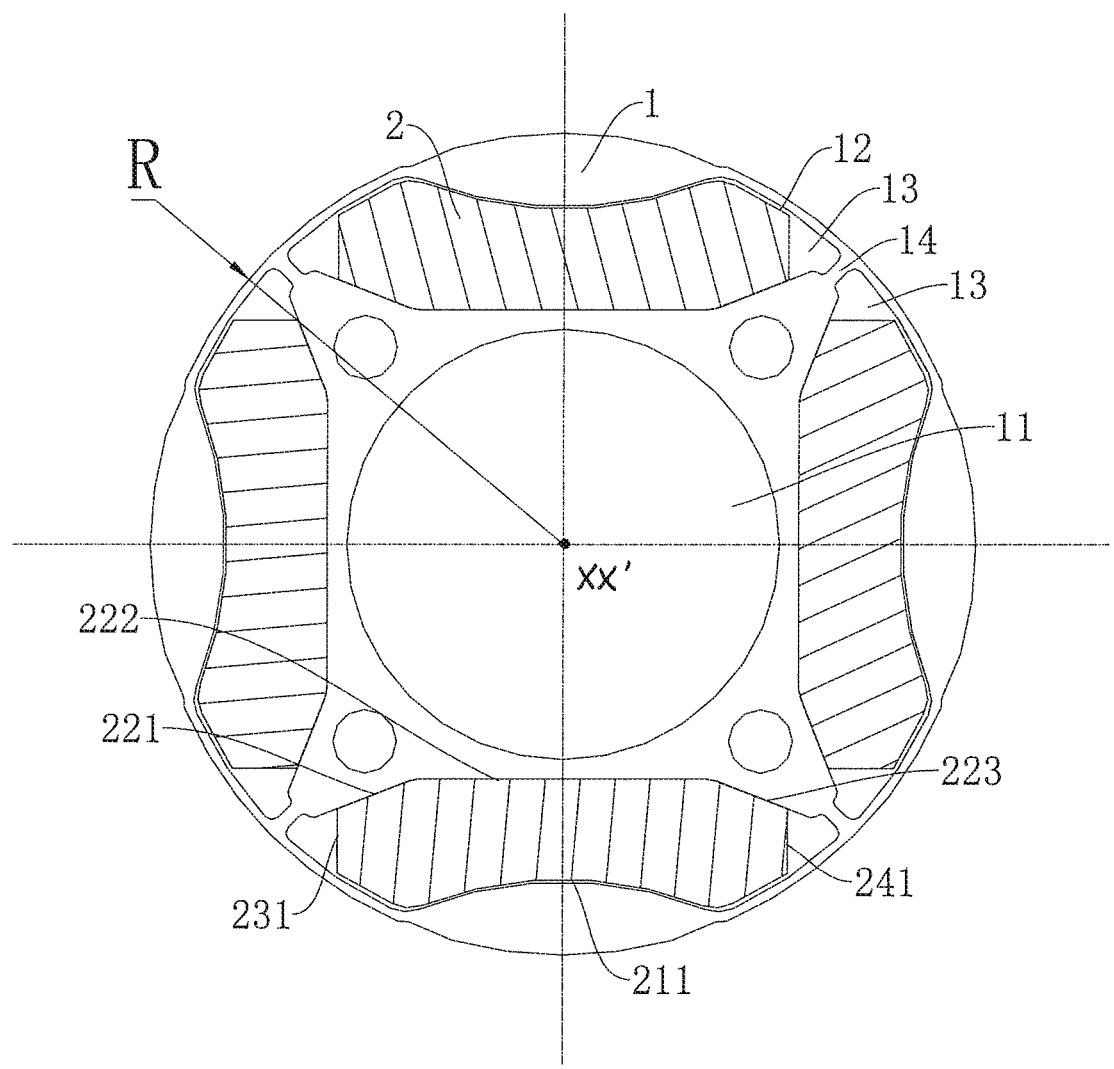
FIG. 4 illustrates a sectional view of a rotor according to an embodiment of the present disclosure.

In an embodiment of the present disclosure, as illustrated in FIGS. 2-4, the second surface 22, when projected on and viewed from the projection surface, is constituted by a first straight segment 221, a second straight segment 222, and a third straight segment 223 connected sequentially. The first straight segment 221 and the third straight segment 223 are symmetrical to each other with respect to the magnetic pole centerline. The second straight segment 222 is symmetrical with respect to the magnetic pole centerline. Thus, the structure of the rotor can be symmetrical and reasonable, and it is easy to process and form the rotor. Meanwhile, the outer dimension of the rotor core 1 can be fully utilized, and the volume of the permanent magnet 2 can be increased as much as possible while the safety distance between the permanent magnet 2 and the shaft hole 11 can be ensured. It has been discovered that, in addition to the thickness, the length and the radius in accordance with the above relationship ($0.24 \leq H/R \leq 0.26$ and $1.07 \leq L/R \leq 1.11$), the provision of the three straight segments of the second surface can further reduce the overall dimension of the rotor unexpectedly, for achieving same or similar magnetic energy output.

In some examples of the present disclosure, the relationship between a length L1 of the second straight segment 222 and the radius R of the rotor core 1 satisfies the following relationship: $0.67 \leq L1/R \leq 0.71$. That is, the ratio L1/R of the length L1 of the second straight segment 222 to the radius R of the rotor core 1 is less than or equal to 0.67 and greater than or equal to 0.71. In other words, the ratio L/R of the length L1 of the second straight segment 222 to the radius R of the rotor core 1 ranges from 0.67 to 0.71. For example, the value of L1/R may be 0.67, 0.68, 0.70, 0.71 or the like. It has been discovered that, in addition to the relationship of the thickness, the length and the radius ($0.24 \leq H/R \leq 0.26$ and $1.07 \leq L/R \leq 1.11$), the relationship of the length L and the radius R ($0.67 \leq L1/R \leq 0.71$) further allows the overall structure of the rotor to be unexpectedly reduced without compromising the function and performance of the electric motor. In other words, for a rotor and an electric motor having a predetermined overall structure, the effective volume of the permanent magnets can be significantly increased, and accordingly the magnetic flux and the anti-demagnetization capability of the permanent magnets can be enhanced. As a result, the function of the electric motor can be improved.

In some examples of the present disclosure, an angle α between the first straight segment 221 and the third straight segment 223 has a range of $125° \leq \alpha \leq 145°$. That is, the angle α between the first straight segment 221 and the third straight segment 223 is greater than or equal to 125° and less than or equal to 145°. For example, the angle α may be 125°, 130°, 132°, 133°, 138°, 140°, or 145°, etc. Since the angle α between the first straight segment 221 and the third straight segment 223 ranges from 125° to 145°, the arrangement of the four permanent magnets 2 can be more compact, and the volume of the permanent magnets 2 can be significantly increased, thereby improving the performance of the electric motor.

In an example of the present disclosure, as illustrated in FIGS. 1-4, the permanent magnet 2 further includes a third surface 23 and a fourth surface 24. The third surface 23, when viewed from the projection surface, includes a fourth straight segment 231. The fourth surface 24, when viewed from the projection surface, includes a fifth straight segment 241. The fourth straight segment 231 connects a free end of the first straight segment 221 and one end of the arc segment 211, while the fifth straight segment 241 connects a free end of the third straight segment 223 and the other end of the arc segment 211. The fourth straight segment 231 and the fifth straight segment 241 can be both parallel to the magnetic pole centerline, such that the permanent magnets 2 are structurally aesthetic and easy to process, and the arrangement of the four permanent magnets 2 can be more compact, further reducing the overall volume of the rotor and the electric motor.

In an embodiment of the present disclosure, as illustrated in FIG. 2, the thickness H of the permanent magnet 2 on the magnetic pole centerline is smaller than a thickness H1 between both ends of the permanent magnet 2 in a direction parallel to the magnetic pole centerline, such that the effective volume of the permanent magnet 2 can be increased, thereby enhancing the anti-demagnetization capability and the magnetic flux of the permanent magnet 2, and improving the performance of the electric motor.

In some examples of the present disclosure, referring to FIG. 3, the magnetization mode of the permanent magnet 2 can be radial magnetization (referring to radial magnetization directions r1, r2 in FIG. 3), such that the magnetic density of the permanent magnet 2 can be increased, and the anti-demagnetization capability of the electric motor can be further enhanced, thereby improving the efficiency and performance of the electric motor. The circle center of the projected arc segment 211 of the first surface 21 is a radial center. That is, the radial magnetization direction of the permanent magnet 2 coincides with the radial direction of the arc segment 211, in which case the circle center of the arc segment 211 coincides with a circle center of the radial magnetization direction. Thus, the rotor has good flux concentration effect, the magnetic flux leakage of the rotor is reduced, an air-gap flux density of the electric motor is ensured, and a sinusoidal requirement of an air-gap magnetic field is satisfied, thereby improving the efficiency of the electric motor.

In an alternative embodiment of the present disclosure, at least one end of the permanent magnet 2 is provided with an assembly guiding structure 201, and the permanent magnet 2 is installed into the magnet groove 12 under the guidance of the assembly guiding structure 201, thereby facilitating the installation of the permanent magnet 2. In some examples of the present disclosure, the assembly guiding structure 201 can be disposed only at one end of the permanent magnet 2, or the assembly guiding structures 201 can be disposed at both ends of the permanent magnet 2 separately (as illustrated in FIG. 1), such that either end of the permanent magnet 2 can be inserted into the magnet groove 12 at the time of installation, thereby further improving the assembly efficiency of the rotor.

In another embodiment of the present disclosure, as shown in FIGS. 1 and 3, the assembly guiding structure 201 is configured as a chamfered structure formed at an end of the permanent magnet 2, such that a sectional dimension of the permanent magnet 2 is shrunk at its end face to guide the installation of the permanent magnet 2. The assembly guiding structure 201 has a simple structure and is convenient to produce and process. Certainly, the assembly guiding structure 201 can also be provided at an end of the magnet groove 12, and for example, the end of the magnet groove 12 is also chamfered to expand a sectional dimension of the magnet groove 12 at its end face, which can also serve to guide the installation of the permanent magnet 2.

An electric motor according to embodiments of a second aspect of the present disclosure includes a stator and the rotor according to the embodiments of the first aspect of the present disclosure. The stator defines a rotor hole, and the rotor is disposed in the rotor hole.

For the electric motor according to the embodiments of the present disclosure, by providing the rotor according to the embodiments of the first aspect of the present disclosure, the overall volume and production cost of the electric motor can be reduced while the working performance of the electric motor can be ensured, thereby facilitating the miniaturization of the electric motor.

A compressor according to embodiments of a third aspect of the present disclosure includes the electric motor according to the embodiments of the second aspect of the present disclosure, and the compressor can be used in a refrigerator.

For the compressor according to the embodiments of the present disclosure, by providing the electric motor according to the embodiments of the second aspect of the present disclosure, the overall volume and production cost of the compressor can be reduced while the working performance of the compressor can be ensured, thereby facilitating the miniaturization of the compressor.

Reference throughout this specification to "an embodiment," "some embodiments," "an exemplary embodiment", "an example," "a specific example," or "some examples," means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that any changes, modifications, alternatives and variations can be made in the embodiments without departing from principles and purposes of the present disclosure. The scope of the present disclosure is defined by the claims and the equivalents thereof.

What is claimed is:
1. A rotor for an electric motor, comprising:
   a rotor core having a circular cross section, wherein the circular cross section defines a central axis of the rotor, the rotor core comprising:
      a shaft hole, wherein the shaft hole is circular and has a center; and
      four magnet grooves equally-spaced around a circumference of the shaft hole, both ends of each magnet groove being provided with a magnetic isolation slot in communication with the magnet groove, a magnetic isolation bridge being defined between two adjacent magnetic isolation slots; and
   four permanent magnets each provided in a corresponding magnet groove, a shape of each magnet matching a shape of the corresponding permanent magnet groove, each permanent magnet comprising a first surface and a second surface arranged opposite each other in a radial direction of the rotor core, the second surface being radially approximate to the shaft hole,
   wherein, when viewed from a projection surface that is perpendicular to the central axis of the rotor, the first surface comprises an arc segment, when viewed from the projection surface, the second surface comprises a plurality of straight segments connected sequentially, with an angle between two adjacent straight segments,
   wherein a thickness H of each permanent magnet on a corresponding magnetic pole centerline, a length L of the second surface projected on the projection surface, and a radius R of the rotor core satisfy the following relationships: $0.24 \leq H/R \leq 0.26$ and $1.07 \leq L/R \leq 1.11$, wherein the magnetic pole centerline is a line connecting the center of the shaft hole and a center of an imaginary circle that contains the arc segment.

2. The rotor according to claim 1, wherein, when viewed from the projection surface, the second surface comprises a first straight segment, a second straight segment, and a third straight segment connected sequentially, wherein the first straight segment and the third straight segment are symmetrical with each other about the magnetic pole centerline, and wherein the second straight segment is symmetrical about the magnetic pole center line.

3. The rotor according to claim 2, wherein a length L1 of the second straight segment and the radius R of the rotor core satisfy the following relationship: $0.67 \leq L1/R \leq 0.71$.

4. The rotor according to claim 2, wherein an angle α between the first straight segment and the third straight segment has a range of $125° \leq \alpha \leq 145°$.

5. The rotor according to claim 2,
wherein each permanent magnet further comprises a third surface and a fourth surface,
wherein when viewed from the projection surface, the third surface comprises a fourth straight segment connecting a free end of the first straight segment and one end of the arc segment,
wherein when viewed from the projection surface, the fourth surface comprises a fifth straight segment connecting a free end of the third straight segment and the other end of the arc segment, and
wherein the fourth straight segment and the fifth straight segment are both parallel to the magnetic pole centerline.

6. The rotor according to claim 1, wherein the thickness H of each permanent magnet on the magnetic pole centerline is smaller than a thickness H1 between both ends of said each permanent magnet in a direction parallel to the magnetic pole centerline.

7. The rotor according to claim 1, wherein at least one end of each permanent magnet is provided with an assembly guiding structure.

8. The rotor according to claim 7, wherein the assembly guiding structure is a chamfered structure formed at the at least one end of each permanent magnet.

9. An electric motor comprising:
a stator defining a rotor hole therein; and
a rotor according to claim 1, the rotor being provided in the rotor hole.

10. A compressor, comprising an electric motor according to claim 9.

* * * * *